(12) United States Patent
Kwak et al.

(10) Patent No.: US 10,969,629 B2
(45) Date of Patent: *Apr. 6, 2021

(54) DISPLAY DEVICE AND METHOD FOR MANUFACTURING THE DISPLAY DEVICE

(71) Applicant: Samsung Display Co., Ltd., Yongin-si (KR)

(72) Inventors: Eun-ae Kwak, Gunpo-si (KR); Min-uk Kim, Daejeon (KR); Junho Song, Seongnam-si (KR); Youngje Cho, Hwaseong-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/889,703

(22) Filed: Jun. 1, 2020

(65) Prior Publication Data

US 2020/0292886 A1    Sep. 17, 2020

Related U.S. Application Data

(63) Continuation of application No. 16/240,773, filed on Jan. 6, 2019, now Pat. No. 10,705,384.

(30) Foreign Application Priority Data

Jan. 9, 2018  (KR) ........................ 10-2018-0002933

(51) Int. Cl.
*G02F 1/13357*   (2006.01)
*G02F 1/1335*    (2006.01)

(52) U.S. Cl.
CPC .. *G02F 1/133617* (2013.01); *G02F 1/133512* (2013.01); *G02F 1/133514* (2013.01);
(Continued)

(58) Field of Classification Search
CPC ......... G02F 1/133512; G02F 1/133514; G02F 1/133516; G02F 2001/133614; G02F 2001/133617
See application file for complete search history.

(56) References Cited

U.S. PATENT DOCUMENTS 4,788,176 A    11/1988  Wieserman et al.
7,737,631 B2   6/2010   Uhlig et al.
(Continued)

FOREIGN PATENT DOCUMENTS

CN    102757520    5/2016
JP    4745062      8/2011
(Continued)

OTHER PUBLICATIONS

Mutin et.al. (2004). Selective Surface Modification of SiO2—TiO2 Supports with Phosphonic Acids, Chem. Mater. 16, 5670-5675.
(Continued)

*Primary Examiner* — Jessica M Merlin
(74) *Attorney, Agent, or Firm* — H.C. Park & Associates, PLC

(57) ABSTRACT

A color conversion substrate and a display device including the same. The color conversion substrate includes a color filter layer having a plurality of color filters, and a color conversion layer disposed on the color filter layer. The color conversion layer includes a plurality of dams, and a plurality of conversion parts disposed between the dams. A reflection layer is disposed on the dams, and a hydrophobic area is disposed on the reflection layer, overlapping an upper surface of the dams, and non-overlapping a side surface of the dams. The display device further includes a light source configured to output a first color light to the color conversion substrate.

16 Claims, 10 Drawing Sheets

(52) U.S. Cl.
CPC .. *G02F 1/133516* (2013.01); *G02F 1/133553* (2013.01); *G02F 1/133621* (2013.01); *G02F 2001/133614* (2013.01); *G02F 2202/36* (2013.01)

(56) References Cited

U.S. PATENT DOCUMENTS

| | | | |
|---|---|---|---|
| 8,568,522 | B2 | 10/2013 | Klippel et al. |
| 8,653,211 | B2 | 2/2014 | Kang et al. |
| 10,705,384 | B2 * | 7/2020 | Kwak ............... G02F 1/133617 |
| 2010/0227252 | A1 | 9/2010 | Kiefer et al. |
| 2017/0176816 | A1 * | 6/2017 | Han ...................... G03F 7/0007 |
| 2017/0240728 | A1 | 8/2017 | Kee et al. |

FOREIGN PATENT DOCUMENTS

| | | |
|---|---|---|
| KR | 10-1407926 | 6/2014 |
| KR | 10-2017-0099016 | 8/2017 |

OTHER PUBLICATIONS

Banerjee et al. Interfaces (2017). Poly(vinylidene fluoride) Containing Phosphonic Acid as Anti-Corrosion Coating for Steel. ACS Appl. Mater. Interfaces, 9 (7), 6433-6443.

Hanson et al. (2003). Bonding Self-Assembled, Compact Organophosphonate Monolayers to the Native Oxide Surface of Silicon. J. Am. Chem. Soc., 125, 16074-16080.

Zschieschang et al. (2010). Mixed Self-Assembled Monolayer Gate Dielectrics for Continuous Threshold Voltage Control in Organic Transistors and Circuits. Adv. Mater. 22, 4489-4493.

Kim et al. (2010). Ferrocene Functional Polymer Brushes on Indium Tin Oxide via Surface-Initiated Atom Transfer Radical Polymerization. Langmuir 26, 2083-2092.

Notice of Allowance issued in U.S. Appl. No. 16/240,773 dated Feb. 18, 2020.

* cited by examiner

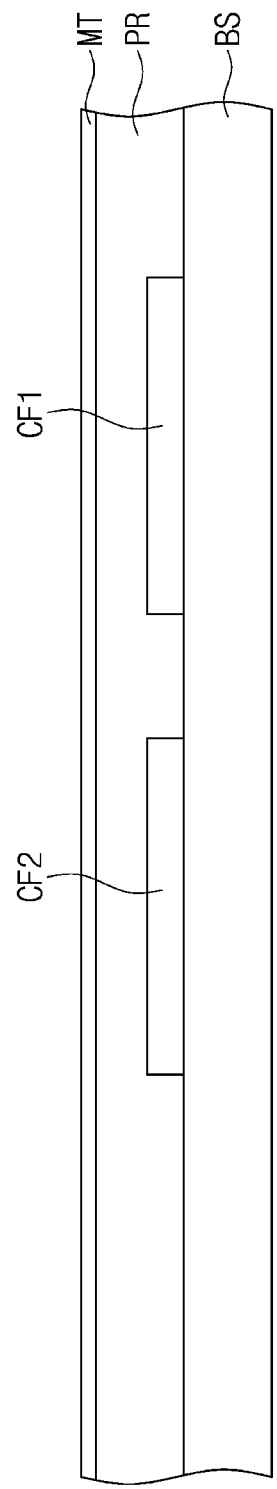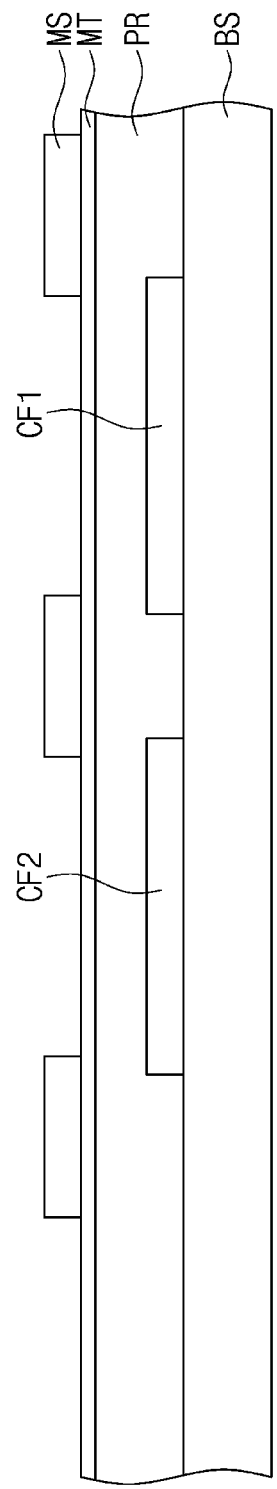

DISPLAY DEVICE AND METHOD FOR MANUFACTURING THE DISPLAY DEVICE

CROSS-REFERENCE TO RELATED APPLICATION

This application is a Continuation of U.S. patent application Ser. No. 16/240,773, filed on Jan. 9, 2019, which claims priority from and the benefit of Korean Patent Application No. 10-2018-0002933, filed on Jan. 9, 2018, each of which is hereby incorporated by reference for all purposes as if fully set forth herein.

BACKGROUND

Field

Exemplary embodiments of the invention relate generally to a display device and, more specifically, to a method for manufacturing the display device.

Discussion of the Background

A display device may include a display panel configured to display an image by using light, and a backlight unit configured to generate light for providing to the display panel. The backlight unit is disposed below the display panel and provides light to the display panel.

The display panel may include a plurality of pixels configured to display an image by using light, and a color conversion part configured to provide color to light transmitted through the pixels. The areas of the plurality of pixels are defined by barrier ribs, and a plurality of color conversion parts are provided for color reproduction in the areas defined by the barrier ribs.

The above information disclosed in this Background section is only for understanding of the background of the inventive concepts, and, therefore, it may contain information that does not constitute prior art.

SUMMARY

Exemplary embodiments of the invention provide a display device capable of preventing light of various colors emitting from light emitters from being mixed.

Exemplary embodiments of the invention also provide a method for manufacturing a display device capable of preventing light of various colors emitting from light emitters from being mixed.

An exemplary embodiment includes a display device including: a display panel; and a light source configured to output a first color light to the display panel, wherein the display panel includes a first display substrate; a second substrate facing the first display substrate; and a liquid crystal layer disposed between the first display substrate and the second display substrate, wherein the second display substrate includes a base substrate; a color filter layer including a plurality of color filters spaced apart from each other on the base substrate; a color conversion layer including a plurality of dams, and a plurality of conversion parts overlapping the color filters, disposed on the base substrate, and disposed between the plurality of dams; a reflection layer disposed on the dams; and a hydrophobic area disposed on the reflection layer, overlapping an upper surface of the dams, and non-overlapping a side surface of the dams.

In an exemplary embodiment, the hydrophobic area may include a polyvinylidene fluoride derivative in which a phosphonate is bonded as a terminal group.

In an exemplary embodiment, the reflection layer may provide a display device overlapping the upper surface of the dam, and non-overlapping the side surface of the dams.

In an exemplary embodiment, the reflection layer may provide a display device which is in contact with the upper surface of the dams.

In an exemplary embodiment, the reflection layer may include a metal or a metal oxide.

In an exemplary embodiment, the hydrophobic area may be in contact with an upper surface of the reflection layer.

In an exemplary embodiment, the reflection layer may have substantially the same area as the upper surface of the dams.

In an exemplary embodiment, the hydrophobic area may have substantially the same area as an upper surface of the reflection layer.

In an exemplary embodiment, the conversion parts may be in contact with the side surfaces of the dams.

In an exemplary embodiment, the color conversion layer may include a first conversion part including a first light emitter configured to absorb the first color light and emit a second color light; a second conversion part including a second light emitter configured to absorb the first color light and emit a third color light; and a third conversion part through which the first color light is transmitted.

In an exemplary embodiment, the first light emitter and the second light emitter may each include quantum dots.

In an exemplary embodiment, the color filter layer may include a first color filter which absorbs or reflects the first color light, and through which the second color light is transmitted; and a second color filter which absorbs or reflects the first color light, and through which the third color light is transmitted.

In an exemplary embodiment, the first color filter may cover the first conversion part, and the second color filter may cover the second conversion part.

In an exemplary embodiment, the display device may further include a black matrix disposed on the base substrate, wherein the black matrix may be covered by the dams.

In an exemplary embodiment, in a thickness direction of the display panel, the first display substrate may be disposed closer to the light source than the second display substrate.

In an exemplary embodiment, the first color light may be blue light.

Another exemplary embodiment discloses a method for manufacturing a display device, the method including the steps of: forming, on a base substrate, a first color filter, and a second color filter spaced apart from the first color filter with a predetermined interval; coating a photosensitive material on a front surface of the base substrate on which the first color filter and the second color filter are formed; forming a metal layer on the photosensitive material; positioning a mask having openings on the metal layer; removing the metal layer and the photosensitive material exposed by the openings to form first to third dams spaced apart from each other and a reflection layer disposed on the first to third dams; coating a hydrophobic material on the reflection layer to form a hydrophobic area; forming a first conversion part between the first dam and the second dam, the first conversion part overlapping the first color filter and comprising a first light emitter; and forming a second conversion part between the second dam and the third dam, the second conversion part overlapping the second color filter and comprising a second light emitter.

In an exemplary embodiment, the hydrophobic material may be a polyvinylidene fluoride derivative in which a phosphonate is bonded as a terminal group.

Another exemplary embodiment discloses a method for manufacturing a display device, the including: forming, on the base substrate, a first color filter and a second color filter spaced apart from the first color filter with a predetermined interval; coating a photosensitive material on a front surface of the base substrate on which the first color filter and the second color filter are formed; forming a metal layer on the photosensitive material; coating a hydrophobic material on the metal layer; positioning a mask having openings on the hydrophobic material; removing the metal layer and the hydrophobic material exposed by the openings to form a reflection layer and a hydrophobic area; exposing light to the photosensitive material exposed by the reflection layer and the hydrophobic area; developing the photosensitive material exposed to light to form first to third dams; forming a first conversion part between the first dam and the second dam, the first conversion part overlapping the second color filter and comprising a first light emitter; and forming a second conversion part between the second dam and the third dam, the second conversion part overlapping the second color filter and comprising a second light emitter.

In an exemplary embodiment, the hydrophobic material may be a polyvinylidene fluoride derivative in which a phosphonate is bonded as a terminal group.

Accordingly, exemplary embodiments use selective surface treatment of the dams to provide a hydrophobic area overlapping an upper surface of the dams, but not overlapping side surfaces of the dams, such that air defects in ink filling the dams may be avoided so as to prevent light of various colors emitting from light emitters from being mixed.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIGS. 6, 7, 8, 9, 10, 11, 12, 13, 14, and 15 are cross-sectional views illustrating a method for manufacturing a display device according to an exemplary embodiment.

DETAILED DESCRIPTION

Figure 1:
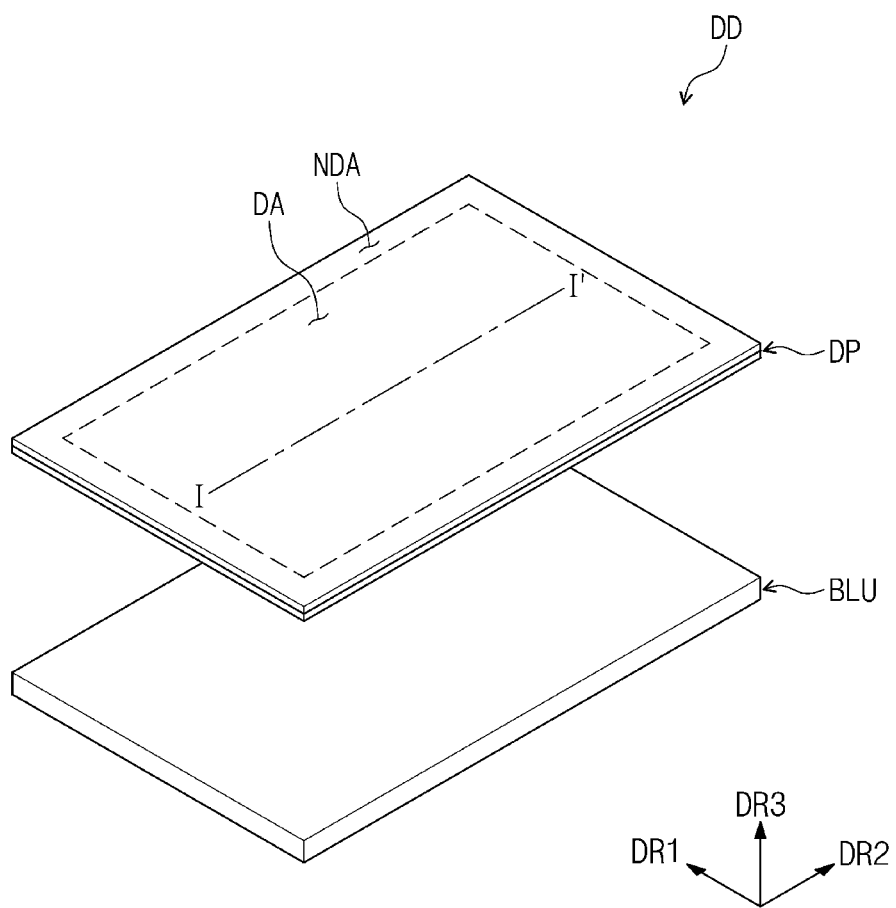
FIG. 1 is an exploded perspective view of a display device according to an exemplary embodiment of invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
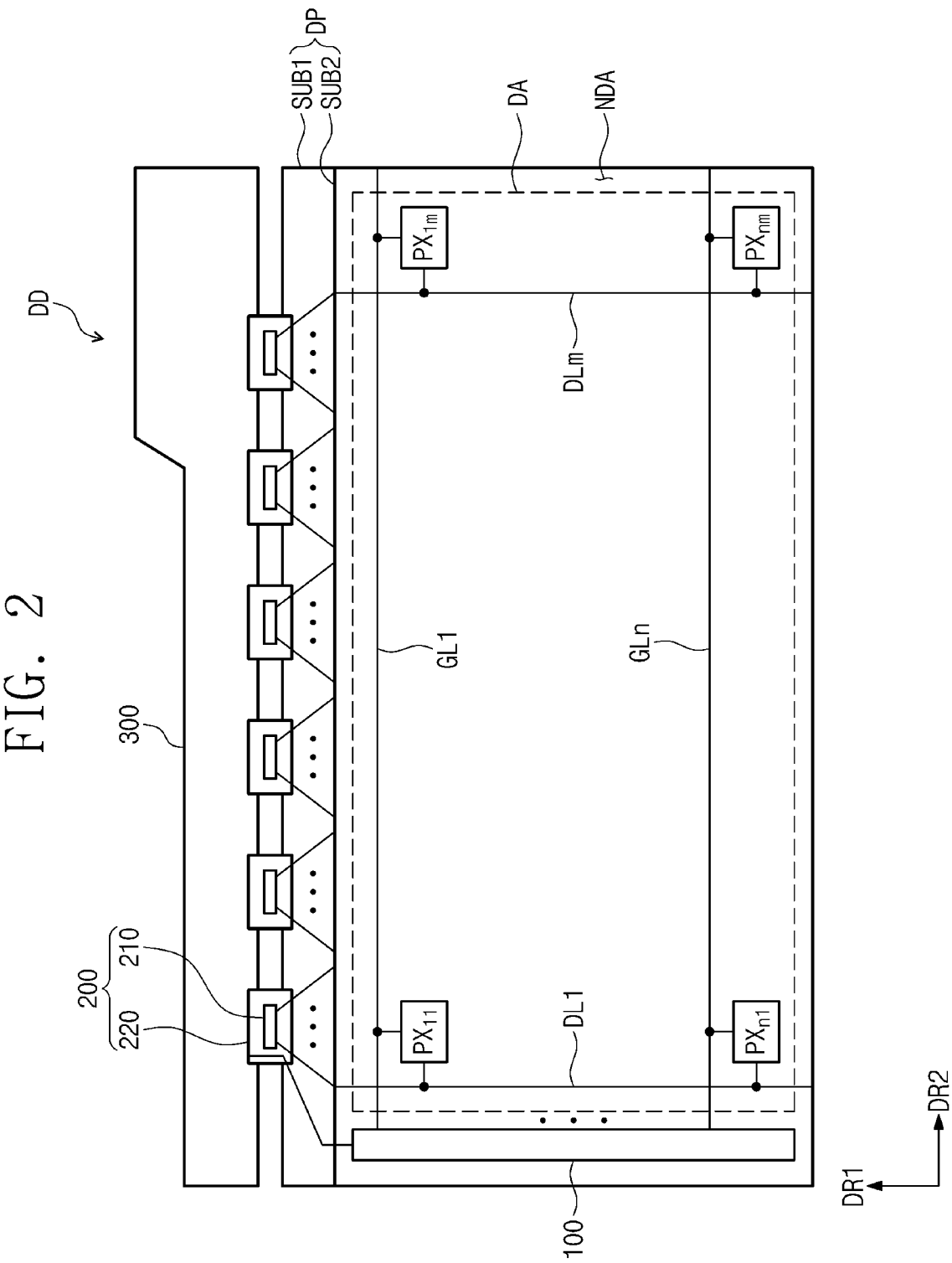
FIG. 2 is a block diagram of a display device according to an exemplary embodiment.

FIG. 1 is an exploded perspective view of a display device according to an exemplary embodiment of the invention. FIG. 2 is a block diagram of a display device according to an exemplary embodiment.

According to an exemplary embodiment, the display device DD illustrated in FIG. 1 may be applied to a tablet PC, a smart phone, a personal digital assistant (PDA), a portable multimedia player (PMP), a game machine, a wristwatch type, an electronic device, or the like. In addition, the display device DD may be applied to large-sized electronic equipment such as a large-sized TV or an external billboard, and small and medium-sized electronic equipment such as a personal computer, a notebook computer, a car navigation unit, or a camera.

Referring to FIG. 1, the display device DD may include a display panel DP and a light source BLU configured to provide light to the display panel DP. The display panel DP provides an image, and the light source BLU may generate a first color light.

The light source BLU may be disposed below the display panel DP and provide the first color light to the display panel DP. The first color light may be blue light. Also, the first color light may be ultraviolet light. For example, the light source BLU may provide light in a wavelength range of greater than or equal to 350 nm and less than or equal to 450 nm.

The light source BLU may include a plurality of light emitting elements. The light emitting elements may output blue light as the first color light. The light source BLU may include a plurality of light emitting elements and a circuit board configured to supply power source to the light emitting elements. The light emitting elements may be disposed on the circuit board.

The first color light generated from the light source BLU may be provided to the display panel DP. The display panel DP may be disposed on the light source BLU. The display panel DP may include a display area DA configured to display an image and a non-display area NDA configured not to display an image. The non-display area NDA may be disposed adjacent to the display area DA. As an example, the non-display area NDA may surround the display area DA.

According to an exemplary embodiment, the display panel DP may include any one panel of a liquid crystal display panel, a plasma display panel, an electrophoretic display panel, a microelectromechanical system (MEMS) display panel and an electrowetting display panel.

Hereinafter, the display panel DP according to an exemplary embodiment, for example, a liquid crystal display panel will be described. The display panel DP may be classified into a twisted-nematic liquid crystal display device, a horizontal electric field liquid crystal display device, a vertically oriented liquid crystal display device, or the like, depending on the characteristics of a liquid crystal layer. Among them, a display panel in accordance with an exemplary embodiment may be provided as the vertically aligned liquid crystal display panel in which liquid crystal molecules are oriented in a predetermined direction and long axes of the liquid crystal molecules are vertically arranged to the substrate surface in the state in which an electric field is not applied.

In addition, the display panel DP is parallel to the plane defined by a first direction DR1 and a second direction DR2. The normal direction of the display panel DP is indicated by a third direction DR3. The third direction DR3 indicates the thickness direction of the display panel DP. The upper surface (front surface) and the lower surface (rear surface) of each of members are divided by the third direction DR3. However, directions indicated by the directions DR1, DR2, and DR3 may be a relative concept and thus may be changed to other directions.

According to an exemplary embodiment, the display device DD is illustrated to have a flat shape, but exemplary embodiments are not limited thereto. In one exemplary embodiment, the display device DD may be a curved display device. For example, the display device DD may be a curved display device which is concavely curved or convexly curved in a whole when the user looks at the display device DD. Further, the display device DD may be a display device bent only at a portion thereof.

In addition, the display device of one exemplary embodiment may be a flexible display device. For example, the display device may be a foldable display device, or a rollable display device.

Referring to FIG. 2, the display panel DP includes a display area DA in which a plurality of pixels $PX_{11}$ to $PX_{nm}$ are formed, and a non-display area NDA surrounding the display area DA.

A plurality of gate lines GL1 to GLn and a plurality of data lines DL1 to DLm crossing the gate lines GL1 to GLn are disposed on a first display substrate SUB1. In FIG. 2, only a part of the plurality of gate lines GL1 to GLn and the plurality of data lines DL1 to DLm is illustrated.

The plurality of gate lines GL1 to GLn are connected to a gate drive circuit 100 to sequentially receive gate signals. The plurality of data lines DL1 to DLm are connected to a data drive circuit 200 to receive analog data signals (or data voltages).

The plurality of pixels $PX_{11}$ to $PX_{nm}$ are connected to corresponding gate lines among the plurality of gate lines and corresponding data lines among the plurality of data lines DL1 to DLm, respectively.

The gate drive circuit 100 may be formed simultaneously with the pixels $PX_{11}$ to $PX_{nm}$ through a thin film process. For example, the gate drive circuit 100 may be integrated on the display panel DP through an oxide silicon gate drive circuit (OSG) process or an amorphous silicon gate drive circuit (ASG) process in the non-display area NDA.

According to an exemplary embodiment, the gate drive circuit 100 is connected the left ends of the plurality of gate lines GL1 to GLn, but this is only one example. The display device may include two gate drive circuits. One of the two gate drive circuits may be connected to the left ends of the plurality of gate lines GL1 to GLn, and the other may be connected to the right ends of the plurality of gate lines GL1 to GLn. Further, one of the two gate drive circuits may be connected to odd number gate lines, and the other may be connected to even number gate lines.

The data drive circuit 200 receives data signals from a signal control unit (not illustrated) mounted on the circuit board 300, and generates analog data signals corresponding to the data signals.

The data drive circuit 200 includes a drive chip 210 and a flexible circuit board 220 on which the drive chip 210 is mounted. The drive chip 210 and the flexible circuit board 220 may be each provided in plurality. The flexible circuit board 220 electrically connects the circuit board 300 and the first display substrate SUB1. The plurality of drive chips 210 provide data signals to corresponding data lines, respectively.

In addition, while FIG. 2 exemplarily illustrates a data drive circuit 200 formed of a tape carrier package (TCP), the data drive circuit 200 may be mounted on the first display substrate SUB1 by a chip on glass (COG) method.

Figure 3:
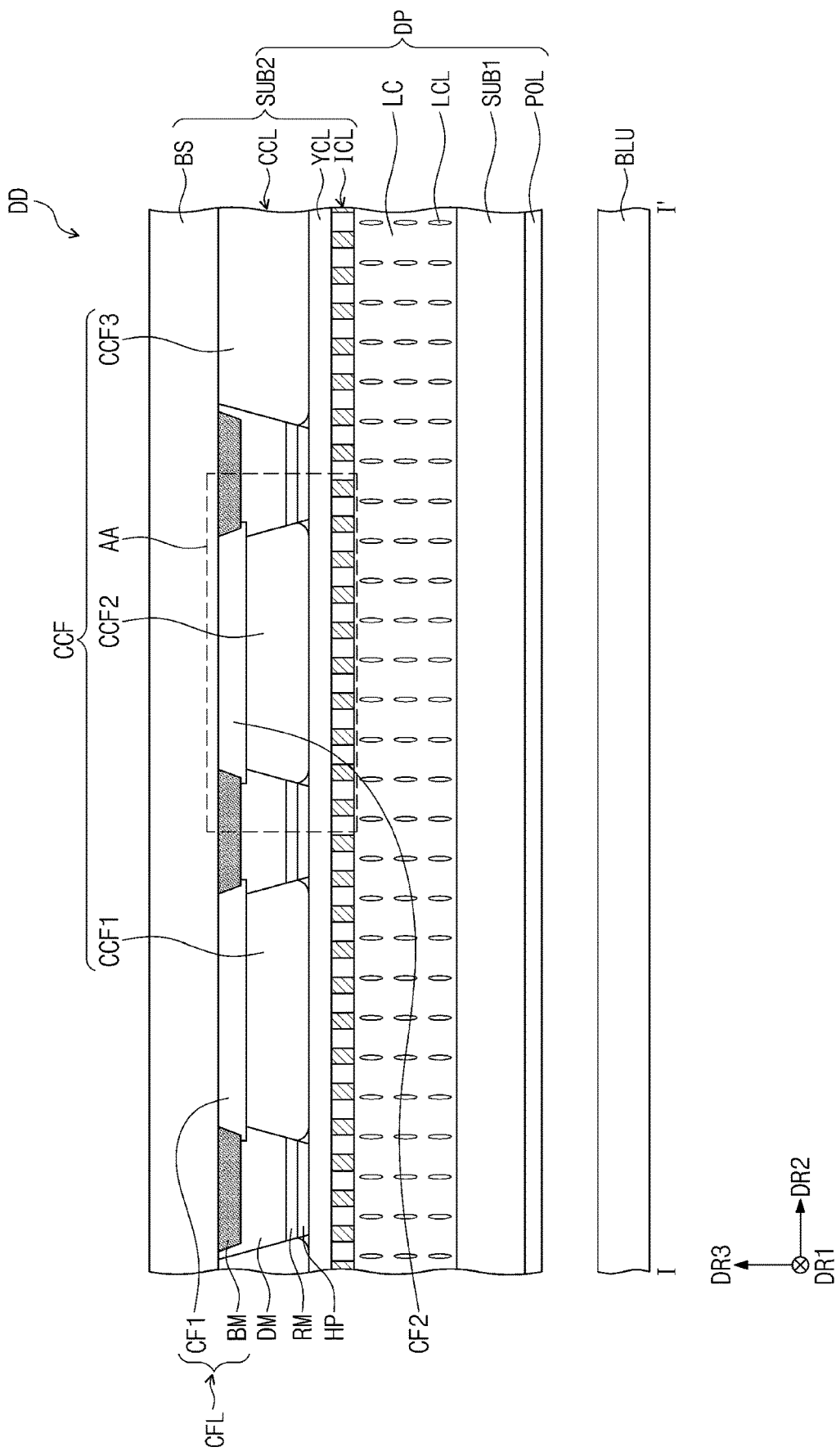
FIG. 3 is a cross-sectional view taken along line I-I' illustrated in FIG. 1 according to an exemplary embodiment.
Figure 4:
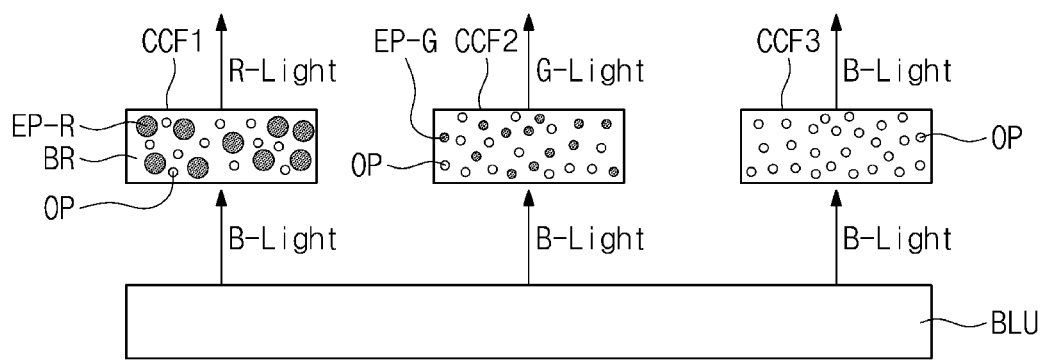
FIG. 4 is a diagram schematically illustrating optical characteristics of a conversion part according to an exemplary embodiment.

FIG. 3 is a cross-sectional view taken along line I-I' illustrated in FIG. 1 according to an exemplary embodiment. FIG. 4 is a diagram schematically illustrating optical characteristics of a conversion part according to an exemplary embodiment.

Referring to FIG. 3, a cross-sectional view of the display area DA of the display panel DP is exemplarily illustrated. The display panel DP may include a first display substrate SUB1 and a second display substrate SUB2, which face each other, and a liquid crystal layer LC. The liquid crystal layer LC may be disposed between the first display substrate SUB1 and the second display substrate SUB2. Hereinafter, the term 'overlap' may be described as meaning that two elements are overlapped in the third direction, which is the thickness direction of the display panel DP.

Although not illustrated, the first display substrate SUB1 may include a pixel layer on which the plurality of pixels $PX_{11}$ to $PX_{nm}$ described in FIG. 2 are disposed, and a drive device layer of the gate drive circuit 100 and the data drive circuit 200. Further, the first display substrate SUB1 may include a base substrate on which the pixel layer and the drive device layer are disposed. Hereinafter, the base substrate of the first display substrate SUB1 will be described as a first base substrate.

The first base substrate, and a second base substrate BS of the second display substrate SUB2 may each be independently a polymer substrate, a plastic substrate, a glass substrate, a quartz substrate, or the like. The first base substrate and the second base substrate BS may each be a transparent insulation substrate. The first base substrate and the second base substrate BS may each be rigid or flexible substrate.

The liquid crystal layer LC is disposed between the first base substrate and the second base substrate BS and includes a plurality of liquid crystal molecules LCL. The liquid crystal layer LC may be provided by orienting liquid crystal molecules LCL having a dielectric anisotropy. The liquid crystal layer LC may be used without particular limitation as long as it includes commonly used liquid crystal molecules. For example, an alkenyl-based liquid crystal compound and an alkoxy-based liquid crystal compound may be used for the liquid crystal molecule LCL. The liquid crystal molecule LCL used in embodiments may have, but is not limited to, a negative dielectric anisotropy. For example, a liquid crystal molecule having a positive dielectric anisotropy may be used.

The second display substrate SUB2 may include the second base substrate BS, a color filter layer CFL, a color conversion layer CCL, a reflection layer RM, and a hydrophobic area HP.

The color filter layer CFL may be disposed on the second base substrate. The color filter layer CFL may be directly patterned on the second base substrate BS. The color filter layer CFL may include a plurality of color filters disposed on the second base substrate BS and spaced apart from each other on a plane. As illustrated in FIG. 3, the color filter layer CFL may include a first color filter CF1 disposed on the second base substrate BS, and a second color filter CF2 spaced apart from the first color filter CF1 in a predetermined interval.

The color conversion layer CCL may include a plurality of dams DM and a plurality of conversion parts CCF disposed between and the plurality of dams DM.

The color conversion layer CCL may include a plurality of dams DM. The plurality of dams DM may be disposed apart from each other with the first color filter CF1 and the second color filter CF2 in-between. The dams DM may include a black matrix BM disposed on the second base substrate BS in order to prevent a light leakage phenomenon. In this case, the black matrix BM may be disposed so as to be covered by the dams DM, but exemplary embodiments are not limited thereto. Also, the dams DM may have a trapezoidal shape.

The reflection layer RM may be disposed on the dams. The reflection layer RM may overlap upper surfaces of the dams DM and non-overlap side surfaces of the dams DM. Further, it is preferable that the reflection layer RM is in contact with the upper surfaces of the dams DM and has substantially the same area as the upper surfaces of the dams DM. The reflection layer RM may be disposed so as to overlap the upper surface and the side surfaces of the dams DM. The reflection layer RM may include, but is not limited to, a metal or a metal oxide. The reflection layer may include, for example, chrome, nickel, indium, gallium, zinc, an oxide thereof, or the like. The reflection layer RM again reflects light scattered by the light emitter, so that light efficiency may be increased. On the other hand, when the second display substrate SUB2 includes the black matrix BM disposed on the second base substrate BS, the reflection layer RM may be a metal layer not having reflective characteristics.

The hydrophobic area HP may be disposed on the reflection layer RM. It is preferable that the hydrophobic area HP is disposed so as to overlap the upper surfaces of the dams DM and non-overlap the side surfaces of the dams DM. It is preferable that the hydrophobic area HP is in contact with the upper surface of the reflection layer RM and has substantially the same area as the upper surface of the reflection layer RM.

In addition, the hydrophobic area HP preferably includes a polyvinylidene fluoride (PVDF) derivative in which a phosphonate is bonded as a terminal group. Specific examples of the polyvinylidene fluoride derivative in which the phosphonate is bonded as a terminal group may include, but is not limited to, 1-phosphono-1H,1H,2H,2H-perfluorodecane($CF_3(CF_2)_7CH_2CH_2PO_3H_2$), 1-phosphono-1H,1H,2H,2H-perfluorohexane($CF_3(CF_2)_3CH_2CH_2PO_3H_2$), 1-phosphono-6-(nonafluorobutyl)hexane($CF_3(CF_2)_3(CH_2)_6PO_3H_2$), 1-phosphono-4-(nonafluorobutyl)butane ($CF_3(CF_2)_3(CH_2)_4PO_3H_2$), 1-phosphono-8-(nonafluorobutyl)octane($CF_3(CF_2)_3(CH_2)_8PO_3H_2$), 1-phosphono-11-(nonafluorobutyl)undecane($CF_3(CF_2)_3(CH_2)_{11}PO_3H_2$), 1-phosphono-11-(heptadecafluorooctyl)undecane($CF_3(CF_2)_7(CH_2)_{11}PO^3H_2$), 1-phosphono-22-(nonafluorobutyl) docosane($CF_3(CF_2)_3(CH_2)_{22}PO_3H_2$), or the like.

A compound in which the phosphonate is bonded as a terminal group may strongly react with a layer made of a metal or a metal oxide in a short period of time, and thus may be applied advantageously onto the reflection layer RM. Further, the polyvinylidene fluoride is a hydrophobic material, and may be disposed on the reflection layer RM to impart a hydrophobic property to the upper surface of the reflection layer RM. Due to this, the phenomenon that the light emitters overflow the dams DM, and the color lights emitting from the light emitters are mixed may be prevented.

The color conversion layer CCL may include a plurality of conversion parts CCF. The plurality of conversion parts CCF overlap the color filters CF1 and CF2, and may be formed between the dams DM through the inkjet method. That is, after the dams DM are disposed on the second base substrate BS, the light emitter may be filled between two dams DM adjacent to each other. In this case, the hydrophobic area HP prevents the light emitter from overflowing the dams DM and may keep the light emitter at a certain height. Also, the hydrophobic area HP non-overlaps (does not overlap) the side surfaces of the dams DM, so that the side surfaces of the dams DM may be hydrophobic. Due to this, the ink including the light emitters may flow easily along the side surfaces of the dams DM.

The conversion parts CCF may be disposed between the liquid crystal layer LC and the second base substrate BS. The conversion parts CCF may be in contact with the side surfaces of the dams DM and disposed on the second base substrate BS. The conversion parts CCF may include a light emitter which may absorbs the first color light provided from the light source BLU and emits light in a color different from the first color.

In detail, the conversion parts CCF may include a first conversion part CCF1 including a first light emitter EP-R, a second conversion part CCF2 including a second light emitter EP-G, and a third conversion part CCF3 through which the first color light is transmitted. The first conversion part CCF1 and the second conversion part CCF2 overlap the first color filter CF1 and the second color filter CF2, respectively. Specifically, the first color filter CF1 may cover the first conversion part CCF1, and the second color filter CF2 may cover the second conversion part CCF2.

Referring to FIG. 4, for example, the first light emitter EP-R may absorb the first color light, which is blue light B-Light and emit red light, and the second emitter EP-G may absorb the first color light, which is blue light and emit green light. Hereinafter, the red light is described as a second color light, and the green light is described as a third color light. That is, the first conversion part CCF1 may be a first light emitting area configured to emit red light, and the second conversion part CCF2 may be a second light emitting area configured to emit green light.

In addition, the third conversion part CCF3 may be a part not including a light emitter. The third conversion part CCF3 may be a part through which the first color light provided from the light source is transmitted. That is, the third conversion part CCF3 may be a light emitting area from which blue light is emitted.

Meanwhile, the first color light is absorbed into the first and second conversion parts CCF1 and CCF 2, and mostly emitted as the second color light and the third color light, but some of the first color light may not react with the light emitter. In this case, the first color light not having reacted with the light emitter may be transferred to the second base substrate BS by passing through the first and second conversion parts CCF1 and CCF2.

However, the first color filter CF1 may transmit the incident second color light, and may absorb or reflect some of the incident first color light. Further, the second color filter CF2 may transmit the incident third color light, and may absorb or reflect some of the incident first color light. Due to this, the first color light may not pass through the first color filter CF1 and the second color filter CF2. Therefore, there may be prevented the afterimage of a blue component from being generated due to the first color light emitting from the first and second conversion parts CCF1 and CCF2.

The first to third conversion parts CCF1, CCF2, and CCF3 may include a base resin BR. The base resin BR may be a polymer resin. For example, the base resin BR may be an acryl-based resin, a urethane-based resin, a silicon-based resin, an epoxy-based resin, or the like. The base resin BR may be a transparent resin.

In addition, the first to third conversion parts CCF1, CCF2, and CCF3 may further include scattering particles OP. The scattering particles OP may be $TiO_2$, silica-based nanoparticles, or the like. The scattering particles OP may scatter light emitting from the light emitter, and emit the scattered light to the outside of the conversion part. Further, in the case of the third conversion part CCF3 through which the provided light is transmitted without change, the scattering particles OP may scatter the provided light, and emit the scattered light to the outside.

The first and second light emitters EP-R and EP-G (hereinafter referred to as light emitters) included in the color conversion layer CCL may be fluorescent materials or quantum dots. That is, in one embodiment, the color conversion layer CCL may include at least one of fluorescent materials or quantum dots as light emitters EP-R and EP-G.

As an example, the fluorescent materials used as light emitters EP-R and EP-G may be inorganic fluorescent materials. The fluorescent materials used as light emitters EP-R and EP-G in the display device DD of one embodiment may be a green fluorescent material or a red fluorescent material.

The green fluorescent material may be at least one selected from the group consisting of $YBO_3:Ce_3^+$, $Tb_3^+$, $BaMgAl_{10}O_{17}:Eu_2^+$, $Mn_2^+$, $(Sr,Ca,Ba)(Al,Ga)_2S_4:Eu_2^+$; $ZnS:Cu,Al$, $Ca_8Mg(SiO_4)_4Cl_2:Eu_2^+,Mn_2^+;Ba_2SiO_4:Eu_2^+$; $(Ba,Sr)_2SiO_4:Eu_2^+$; $Ba_2(Mg, Zn)Si_2O_7:Eu_2^+$; $(Ba,Sr)Al_2O_4:Eu_2^+$, $Sr_2Si_3O_8.2SrCl_2:Eu_2^+$; and the like.

The red fluorescent material may be at least one selected from the group consisting of $(Sr,Ca,Ba,Mg)P_2O_7:Eu_2^+$, $Mn_2^+$, $CaLa_2S_4:Ce_3^+$; $SrY_2S_4$: $Eu_z^+$, $(Ca,Sr)S$: $Eu_2^+$, $SrS$: $Eu_2^+$, $Y_2O_3$: $Eu_3^+,Bi_3^+$; $YVO_4$: $Eu_3^+,Bi_3^+$; $Y_2O_2S$: $Eu_3^+$, $Bi_3^+$; $Y_2O_2S$: $Eu_3^+$; and the like.

Meanwhile, the kind of the fluorescent material used in the color conversion layer CCL of one embodiment is not limited to the disclosed materials, and a known fluorescent material other than the above-described fluorescent materials may be used.

As another example, the light emitters EP-R and EP-G included in the color conversion layer CCL may be quantum dots. The quantum dot may be selected from Group II-VI compounds, Group III-V compounds, Group IV-VI compounds, Group IV compounds, Group IV compounds, and combinations thereof.

The Group II-VI compounds may be selected from the group consisting of: a two-element compound selected from the group consisting of CSUBe, CdTe, ZnS, ZnSe, ZnTe, ZnO, HgS, HgSe, HgTe, MgSe, MgS, and a mixture thereof; a three-element compound selected from the group consisting of CSUBeS, CSUBeTe, CSUBTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a four-element compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof.

The Group III-V compound may be selected from the group consisting of: a two-element compound selected from the group consisting of GaN, GaP, GaAs, GaSb, A1N, AlP, AlAs, AlSb, InN, InP, InAs, InSb, and a mixture thereof a three-element compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a four-element compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The Group IV-VI compound may be selected from the group consisting of: a two-element compound selected from the group consisting of SnS, SnSe, SnTe, PbS, PbSe, PbTe, and a mixture thereof; a three-element compound selected from the group consisting of SnSeS, SnSeTe, SnSTe, PbSeS, PbSeTe, PbSTe, SnPbS, SnPbSe, SnPbTe, and a mixture thereof; and a four-element compound selected from the group consisting of SnPbSSe, SnPbSeTe, SnPbSTe, and a mixture thereof. The Group IV element may be selected from the group consisting of Si, Ge, and a mixture thereof. The Group IV compound may be a two-element compound selected from the group consisting of SiC, SiGe, and a mixture thereof.

In this case, the two-element compound, the three-element compound, or the four-element compound may be present in the particle at a uniform concentration, or may be present in the same particle, having partially different concentration distributions.

The quantum dot may have a core-shell structure including a core and a shell surrounding the core. Also, the quantum dot may have a core-shell structure in which one quantum dot surrounds other quantum dots. The interface between the core and the shell may have a concentration gradient in which the concentration of the element present in the shell decreases toward the center.

The quantum dot may be a particle having a nanometer scale size. The quantum dot may have a full width of half maximum (FWHM) of the emission wavelength spectrum of about 45 nm or less, preferably about 40 nm or less, more preferably about 30 nm or less, and color purity or color reproducibility may be improved in this range. Further, light emitted through the quantum dot is emitted in all directions, so that a wide viewing angle may be obtained.

In addition, the shape of the quantum dot is not particularly limited as long as being a commonly used shape in the art, but more specifically, may be in the form such as spherical, pyramidal, multi-arm, or cubic nanoparticle, nanotubes, nanowires, nanofibers, plate-like nanoparticles, or the like.

According to an exemplary embodiment, the quantum dot may change the color of the emitted light depending on the particle size. When the first light emitter ER-R and the second light emitter EP-G are quantum dots, the particle size of the first light emitter EP-R and the particle size of the second light emitter EP-G may be different from each other. For example, the size of the first light emitter EP-R may be smaller than that of the second light emitter EP-G. In this case, the first light emitter EP-R may emit light having a shorter wavelength than the second light emitter EP-G.

Referring back to FIG. 3, as described above, the first to the third conversion parts CCF1, CCF2, and CCF3 may be disposed apart from each other between the dams DM. That is, the dams DM may define, on a plane, the boundaries of the first to third conversion parts CCF1, CCF2, and CCF3 spaced apart from each other along the second direction DR2.

As described above, the first and second conversion parts CCF1 and CCF2 may absorb the first color light output from the light source BLU and output the second color light and the third color light, respectively. On the other hand, the first and second conversion parts CCF1 and CCF2 may absorb not only the first color light output from the light source BLU, but also external light through the second base. The external light is defined as any of various lights provided from the outside of the display device DD. In this case, the external light may include blue light having a wavelength of the first color light. When external light having a wavelength of the blue component is absorbed into the first and second conversion parts CCF1 and CCF2 through the second base substrate BS, the external light may react with the light emitter and scatter light. As a result, when the light source BLU is not operated, the external light may cause light leakage or the like.

According to an exemplary embodiment, the first color filter CF1 and the second color filter CF2 may block the peak wavelength of blue light having a first color among the external light incident through the second base substrate BS from the outside.

That is, when the first color light passes through the first color filter CF1 and the second color filter CF2, lights having wavelengths other than light having a blue wavelength may be transferred to the conversion parts CCF. As the light emitters included in each of the conversion parts CCF1, CCF2 and CCF3 react by the blue light, the external light having passed through the first color filter CF1 and the second color filter CF2 may pass through the conversion parts CCF and then be absorbed into a light control layer YCL.

The light control layer YCL may be disposed between the color conversion layer CCL and the liquid crystal layer LC. The light control layer YCL may transmit the first color light, and may absorb partially the incident second and third color lights. As a result, the external light having passed through the first color filter CF1 and the second color filter CF2 may be absorbed into the light control layer YCL.

In addition, the display panel DP includes a polarizing layer POL and an in-cell polarizing layer ICL. The polarizing layer POL has a polarization axis in one direction, and the in-cell polarizing layer ICL may have a polarization axis in another direction orthogonal to the one direction.

As illustrated in FIG. 3, the polarizing layer POL may be disposed on the lower surface of the first display substrate SUB1. The polarizing layer POL may transmit light vibrating in a direction parallel to the polarization axis of the one direction. The polarizing layer POL may be a coating type polarizing layer or a polarizing layer formed by vapor deposition. The polarizing layer POL may be formed by coating a material including a dichroic dye and a liquid crystal compound.

The in-cell polarizing layer ICL may be disposed between the color conversion layer CCL and the liquid crystal layer LC. The in-cell polarizing layer ICL may transmit light vibrating in the direction of the other direction orthogonal to the one direction.

The in-cell polarizing layer ICL may be made of a metallic material, and may include at least one material of aluminum (Al), silver (Ag), and molybdenum-titanium oxide (MTO).

The in-cell polarizing layer ICL may include a wire grid pattern overlapping the display area DA and the non-display area NDA. As another example, the in-cell polarizing layer ICL may overlap only the display area DA, or overlap only one area of the non-display area NDA. The wire grid pattern may transmit light transmitted through the polarizing layer POL in the direction of the other direction orthogonal to the one direction.

Figure 5:
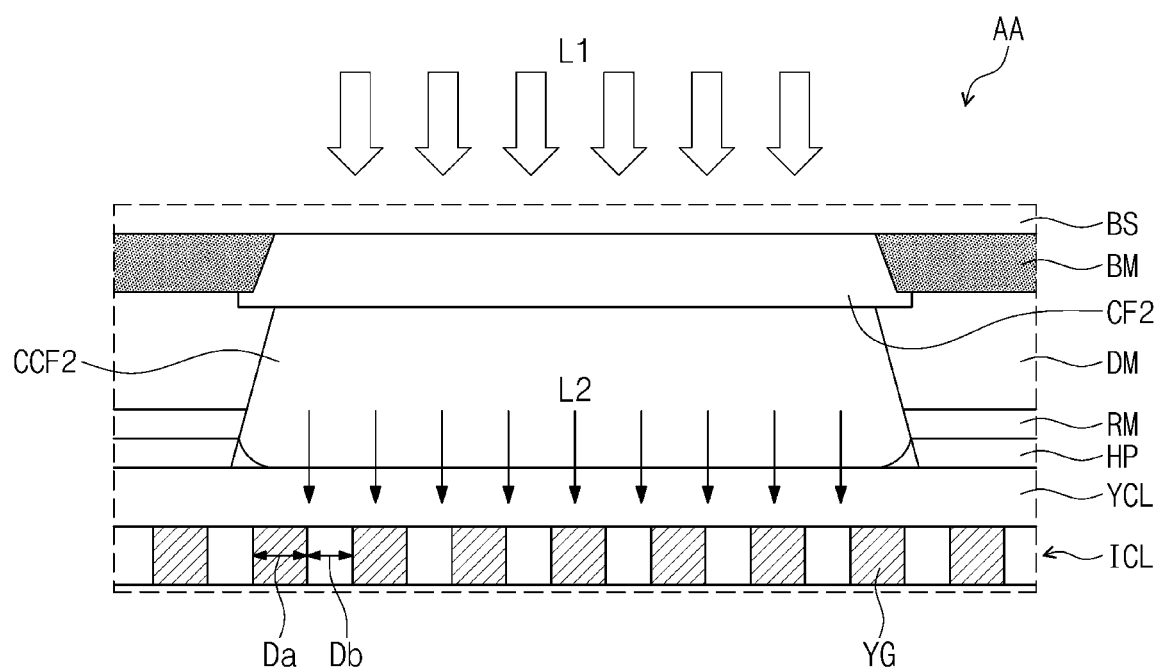
FIG. 5 is an enlarged view of the area AA illustrated in FIG. 3.

FIG. 5 is an enlarged view of the AA area illustrated in FIG. 3.

Referring to FIG. 5, external light L1 (hereinafter referred to as first light) may be incident through the second base substrate BS. As described above, when the first light L1 is incident on the first color filter CF1 and the second color filter CF2, the second light L2 having the wavelengths other than the blue wavelength may pass through the first color filter CF1 and the second color filter CF2. That is, the first color filter CF1 and the second color filter CF2 may block the wavelength of the blue component among the plurality of wavelengths included in the first light. Therefore, the second light L2 having passed through the first color filter CF1 and the second color filter CF2 is transferred to the light control layer YCL without the blue component. The second light L2 transferred to the light control layer YCL may be absorbed into the light control layer YCL.

In addition, the wire grid patterns YG of the in-cell polarizing layer ICL may each have a line width Da in the range of 10 to 50 nm, and the interval Db between two wire grid patterns YG adjacent to each other may be in the range of 10 to 100 nm.

Hereinafter, a method for manufacturing a display device according to an exemplary embodiment will be described with reference to the drawings. FIGS. 6 to 12 are cross-sectional views illustrating a method for manufacturing a display device according to an exemplary embodiment of the invention.

Figure 6:
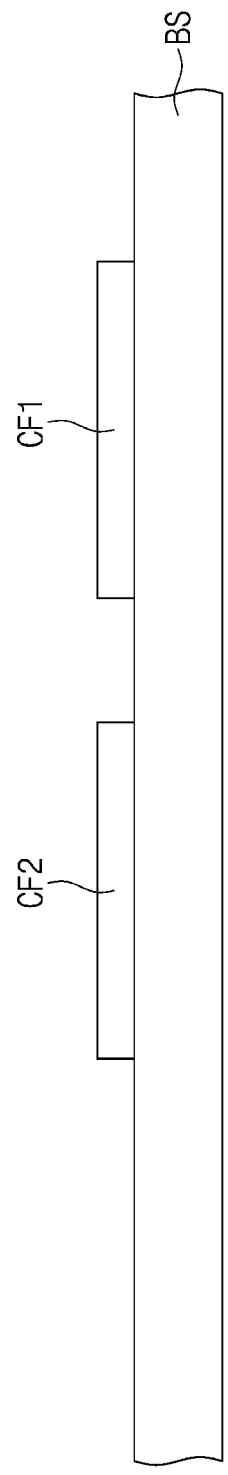

As illustrated in FIG. 6, a first color filter CF1 and a second color filter CF2 spaced apart from the first color filter CF1 with a predetermined interval are formed on a second base substrate BS. Here, the first color filter CF1 and the second color filter CF2 may have the same configuration and are patterned on the base substrate BS by the same process. Thereafter, although not illustrated, a black matrix BM may be formed between the color filters with a predetermined interval.

Figure 7:
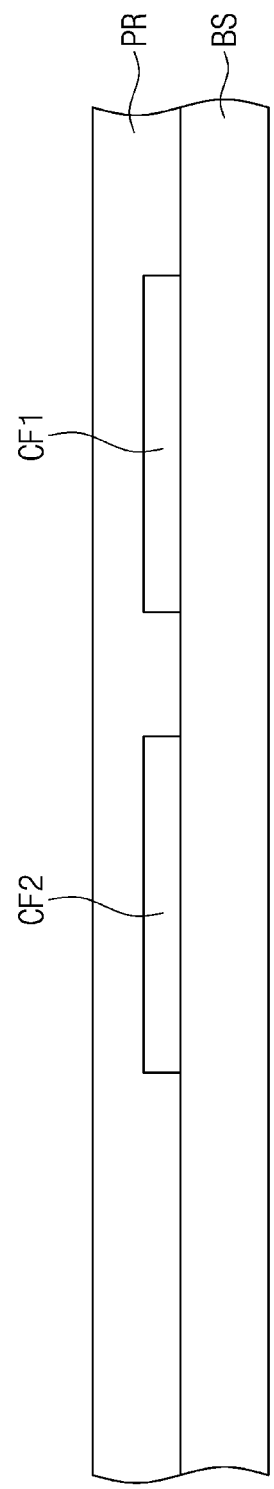

As illustrated in FIG. 7, the method may include coating a photosensitive material PR on the front surface of the second base substrate BS on which the first color filter CF1 and the second color filter CF2 are formed. In this case, the photosensitive material PR is preferably a positive photosensitive material, but is not limited thereto.

As illustrated in FIG. 8, the method may include forming a metal layer MT on the photosensitive material PR.

As illustrated in FIG. 9, the method may include positioning a mask MS having openings on the metal layer MT.

Figure 10:
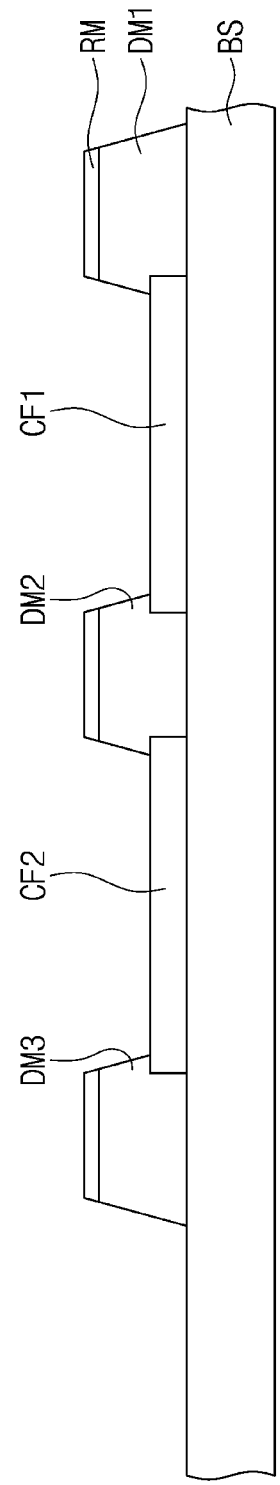

Thereafter, the metal layer MT and the photosensitive material PR exposed by the openings may be removed. The exposed metal layer MT may be removed by an etching solution, and the photosensitive material PR may be removed by development after exposure to light. Accordingly, as illustrated in FIG. 10, there may be formed first to third dams DM1, DM2 and DM3 spaced apart from each other, and a reflection layer RM disposed on the first to third dams DM1, DM2 and DM3. Specifically, on the base substrate BM, there are formed the first dam DM1 and the second dam DM2 spaced apart from each other with the first color filter CF1 in-between, and the third dam DM3 spaced apart from the second dam DM2 with the second color filter CF2 in-between.

Figure 11:
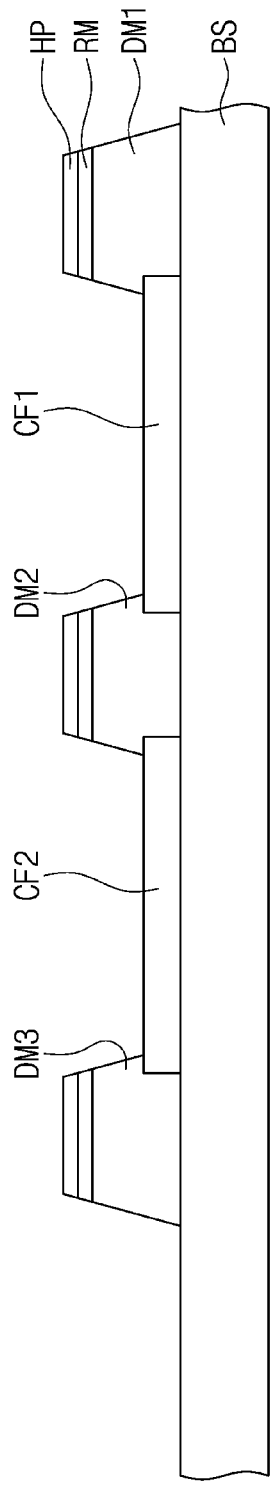

As illustrated in FIG. 11, a hydrophobic area HP may be formed by coating a hydrophobic material on the reflection layer RM. In this case, the hydrophobic material may be coated on the reflection layer RM by using a spray coating method, but exemplary embodiments are not limited thereto.

On the other hand, it is preferable that the hydrophobic material may include a polyvinylidene fluoride (PVDF) derivative in which a phosphonate is bonded as a terminal group. A compound in which the phosphonate is bonded as the terminal group may strongly react with a layer composed of a metal or a metal oxide in a short period of time, and thus may be advantageously applied onto the reflection layer RM. In addition, the polyvinylidene fluoride is a hydrophobic material, and may be disposed on the reflection layer RM to impart a hydrophobic property to the upper surface of the reflection layer RM.

Figure 12:
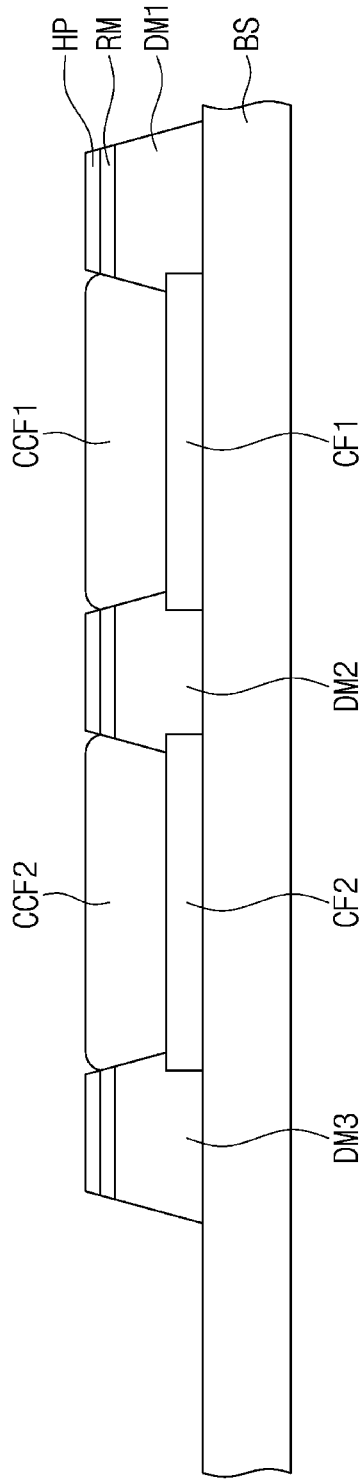

As illustrated in FIG. 12, a first ink layer is formed so as to overlap the first color filter CF1 disposed between the first dam DM1 and the second dam DM2. Here, the first ink layer may be a first conversion part CCF1 including the first light emitter EP-R described in FIG. 4.

A second ink layer is formed so as to overlap the second color filter CF2 disposed between the second dam DM and the third dam CF3. Here, the second ink layer may be a second conversion part CCF2 including the second light emitter EP-G described in FIG. 4.

Meanwhile, a dam spaced apart from the third dam DM3 with a certain interval may be further disposed on the base substrate BS. In this case, a third ink layer may be formed between the third dam DM3 and the dam spaced apart from the third dam DM3 with a certain interval. Here, the third ink layer may be a third conversion part CCF3 which does not include a separate light emitter but includes scattering particles.

Meanwhile, an inkjet method may be used for forming the first to third ink layers. In this case, the hydrophobic area HP prevents the ink including the light emitter from overflowing the dams DM, and prevents the color lights from being mixed, and may maintain the light emitter at a certain height. In addition, the hydrophobic area HP non-overlaps the side surfaces of the dams DM, so that the side surfaces of the dams DM may be hydrophilic. Due to this, the ink including the light emitter may flow easily along the side surface of the dams DM.

Figure 16:
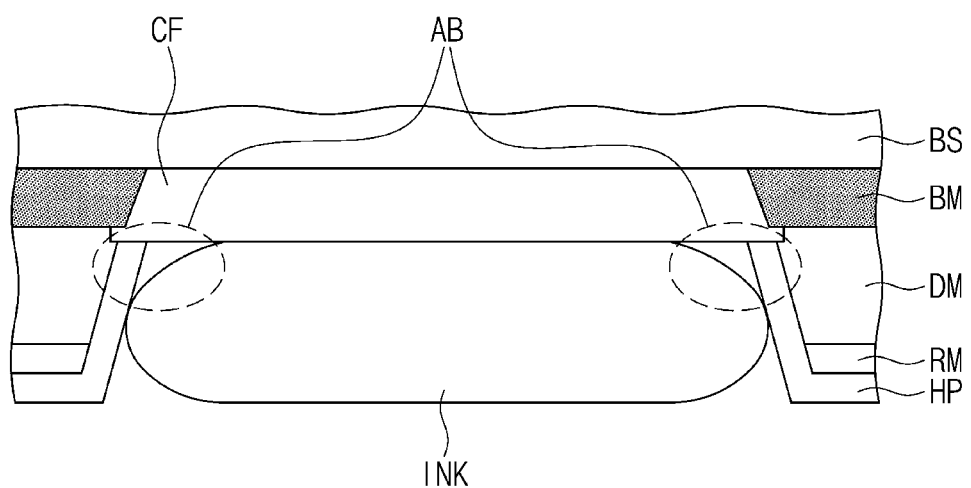
FIG. 16 is a cross-sectional view illustrating a part of the display device manufactured by a related art method.

On the other hand, as illustrated in FIG. 16, when the hydrophobic area HP is disposed the side surfaces of the dams DM in the comparative art, the ink does not flow along the side surface of the dams DM due to the difference in surface characteristics between the ink including the light emitter and the hydrophobic area HP. As a result, the ink does not spread well in the portion where the ink comes into contact with the side surface of the dams DM, so that air defects may be caused in the area AB.

Hereinafter, a method for manufacturing a display device according to another exemplary embodiment will be described with reference to the drawings. FIGS. 6 to 8 and FIGS. 13 to 15 are cross-sectional views illustrating a method for manufacturing a display device according to another exemplary embodiment.

A method for manufacturing a display device according to another exemplary embodiment includes the same steps and contents as those of the method for manufacturing a display device according to the above-described exemplary embodiment, and a redundant description thereof will not be provided herein.

As illustrated in FIG. 6, a first color filter CF1 and a second color filter CF2 spaced apart from the first color filter CF1 with a predetermined interval may be formed on a second base substrate BS.

As illustrated in FIG. 7, the method may include coating a photosensitive material PR on the front surface of the second base substrate BS on which the first color filter CF1 and the second color filter CF2 are formed. In this case, it is preferable that the photosensitive material PR is a positive photosensitive material.

As illustrated in FIG. 8, the method may include forming a metal layer MT on the photosensitive material PR.

Figure 13:
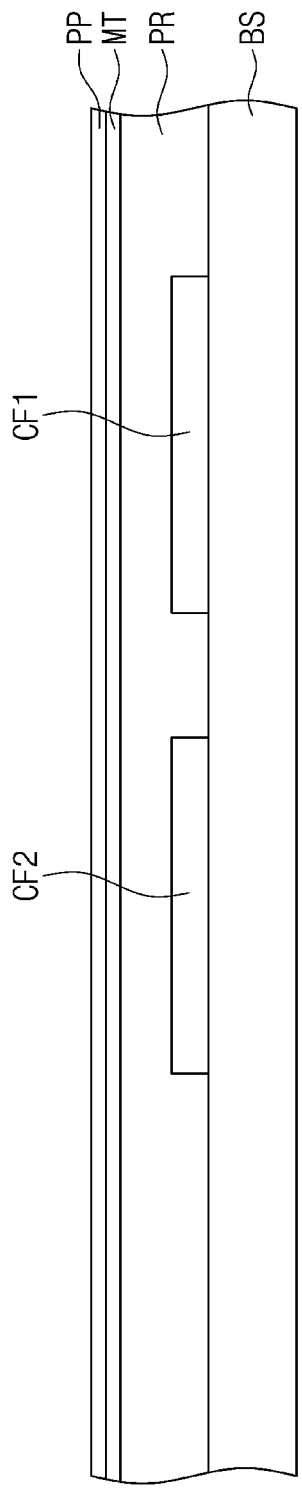

As illustrated in FIG. 13, the method may include coating a hydrophobic material PP on the metal layer MT. In this case, the hydrophobic material may PP be coated on the metal layer MT by using a spin coating method, but exemplary embodiments are not limited thereto.

Figure 14:
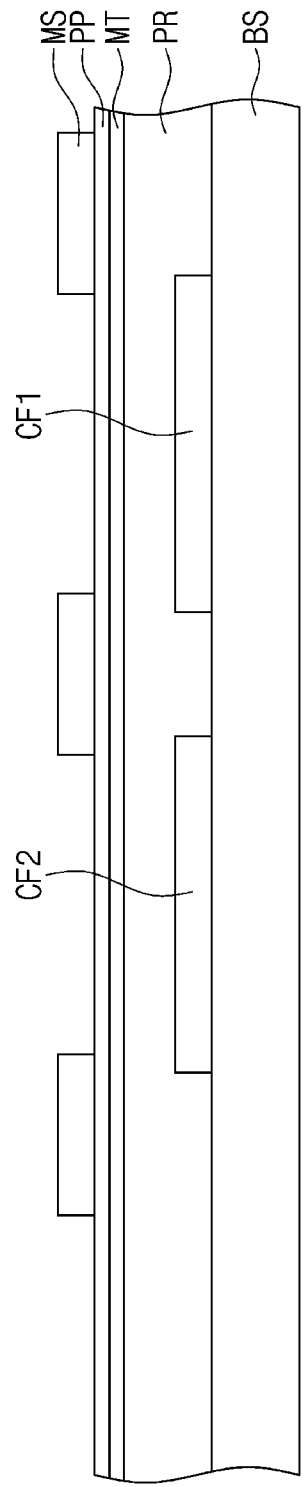
Figure 15:
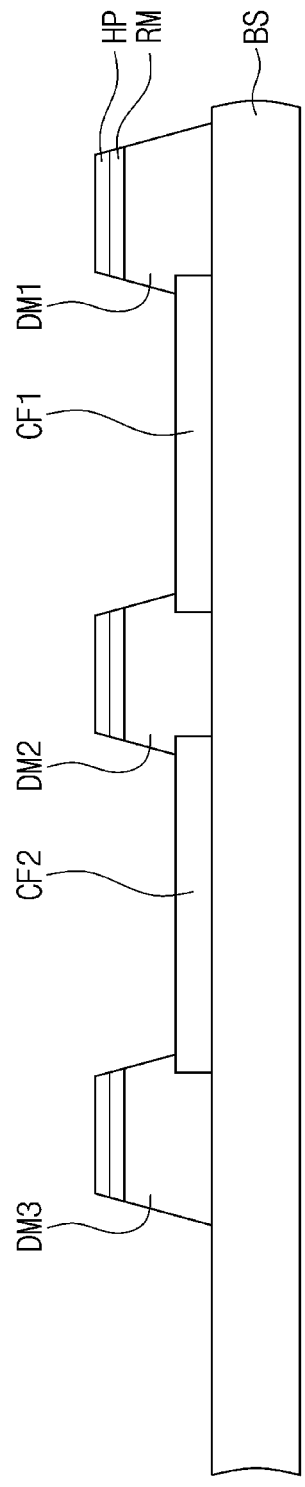

As illustrated in FIG. 14, the method may include positioning a mask MS having openings on the hydrophobic material PP. Thereafter, the metal layer MT and the hydrophobic material PP exposed by the openings may be removed. The exposed metal layer MT and hydrophobic material PP may be removed by an etching solution, but exemplary embodiments are not limited thereto. The exposed metal layer MT and hydrophobic material PP are removed, so that a reflection layer RM and a hydrophobic area HP may be formed on the first to third dams DM1, DM2, and DM3, as illustrated in FIG. 15.

Thereafter, the method may include removing the photosensitive material PR exposed by the reflection layer RM and the hydrophobic area HP by development after exposure to light. Accordingly, as illustrated in FIG. 15, the first to third dams DM1, DM2, and DM3 may be formed spaced apart from each other.

As illustrated in FIG. 12, a first ink layer may be formed so as to overlap the first color filter CF1 disposed between the first dam DM1 and the second dam DM2. Here, the first ink layer may be a first conversion part CCF1 including the first light emitter EP-R described in FIG. 4.

A second ink layer may be formed so as to overlap the second color filter CF2 disposed between the second dam DM2 and the third dam DM3. Here, the second ink layer may be a second conversion part CCF2 including the second light emitter EP-G described in FIG. 4.

According to an exemplary embodiment, the phenomenon in which light emitters overflow dams and the color lights are mixed may be prevented through the selective surface treatment of the dam.

Some of the advantages that may be achieved by exemplary embodiments of the invention include the prevention of air gaps, such as those in areas AB of FIG. 16, that scatter and mix light of various colors in comparative devices.

Although certain exemplary embodiments and implementations have been described herein, other embodiments and modifications will be apparent from this description.

Accordingly, the inventive concepts are not limited to such embodiments, but rather to the broader scope of the appended claims and various obvious modifications and equivalent arrangements as would be apparent to a person of ordinary skill in the art.

What is claimed is:

1. A color conversion substrate comprising:
a color filter layer including a plurality of color filters;
a color conversion layer disposed on the color filter layer, the color conversion layer including a plurality of dams, and a plurality of conversion parts disposed between the plurality of dams;
a reflection layer disposed on the dams; and
a hydrophobic area disposed on the reflection layer, overlapping upper surfaces of the dams, and non-overlapping side surfaces of the dams.

2. The color conversion substrate of claim 1, wherein the hydrophobic area comprises a polyvinylidene fluoride derivative in which a phosphonate is bonded as a terminal group.

3. The color conversion substrate of claim 1, wherein the reflection layer overlaps the upper surfaces of the dams and non-overlaps the side surfaces of the dams.

4. The color conversion substrate of claim 1, wherein the reflection layer comprises a metal or a metal oxide.

5. The color conversion substrate of claim 1, wherein the hydrophobic area is in contact with an upper surface of the reflection layer.

6. The color conversion substrate of claim 1, wherein at least one conversion part of the plurality of conversion parts includes quantum dots.

7. The color conversion substrate of claim 6, wherein the at least one conversion part further includes a scattering particle.

8. The color conversion substrate of claim 1, wherein the conversion parts are in contact with the side surfaces of the dams.

9. The color conversion substrate of claim 1, wherein side surfaces of the dams are hydrophilic.

10. A display device comprising:
a color conversion substrate; and
a light source configured to output a first color light to the color conversion substrate,
wherein the color conversion substrate comprises:
a color filter layer including a plurality of color filters;
a color conversion layer disposed on the color filter layer, the color conversion layer including a plurality of dams, and a plurality of conversion parts disposed between the plurality of dams;
a reflection layer disposed on the dams; and
a hydrophobic area disposed on the reflection layer, overlapping upper surfaces of the dams, and non-overlapping side surfaces of the dams.

11. The display device of claim 10, wherein the hydrophobic area is in contact with an upper surface of the reflection layer.

12. The display device of claim 10, wherein the color conversion layer comprises:
a first conversion part including a first light emitter configured to absorb the first color light and emit a second color light;
a second conversion part including a second light emitter configured to absorb the first color light and emit a third color light; and
a third conversion part through which the first color light is transmitted.

13. The display device of claim 12, wherein the first light emitter and the second light emitter each comprises quantum dots.

14. The display device of claim 12, wherein the color filter layer comprises:
a first color filter which absorbs or reflects the first color light, and through which the second color light is transmitted; and
a second color filter which absorbs or reflects the first color light, and through which the third color light is transmitted.

15. The display device of claim 14, wherein the first color filter covers the first conversion part, and the second color filter covers the second conversion part.

16. The display device of claim 10, wherein the first color light is a blue light or an ultraviolet light.

* * * * *